Figure 1:
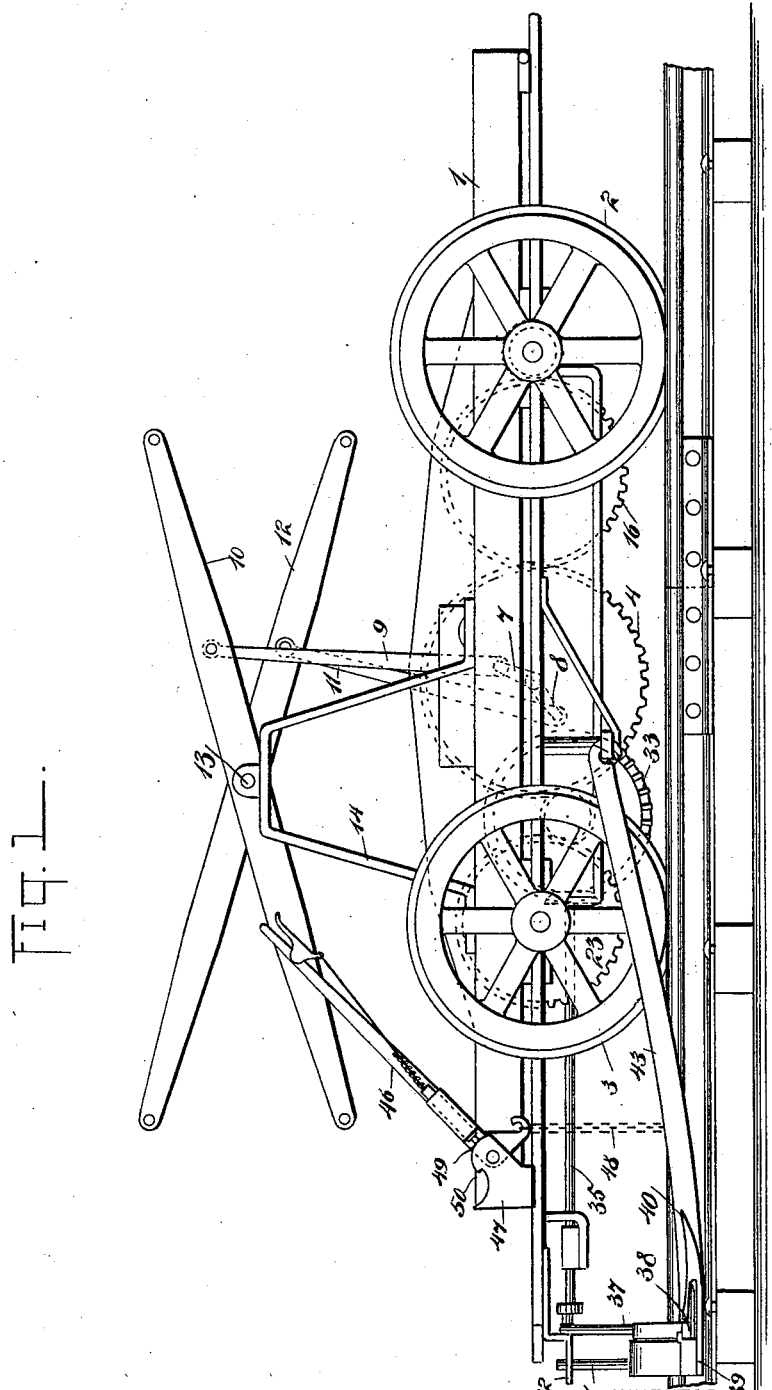

(No Model.) 3 Sheets—Sheet 1.

J. L. SMITH.
COMBINED HAND CAR AND MOWING MACHINE.

No. 599,201. Patented Feb. 15, 1898.

WITNESSES:

INVENTOR
J. L. Smith.
BY
ATTORNEYS.

THE NORRIS PETERS CO., PHOTO-LITHO., WASHINGTON, D. C.

(No Model.) 3 Sheets—Sheet 2.
J. L. SMITH.
COMBINED HAND CAR AND MOWING MACHINE.
No. 599,201. Patented Feb. 15, 1898.
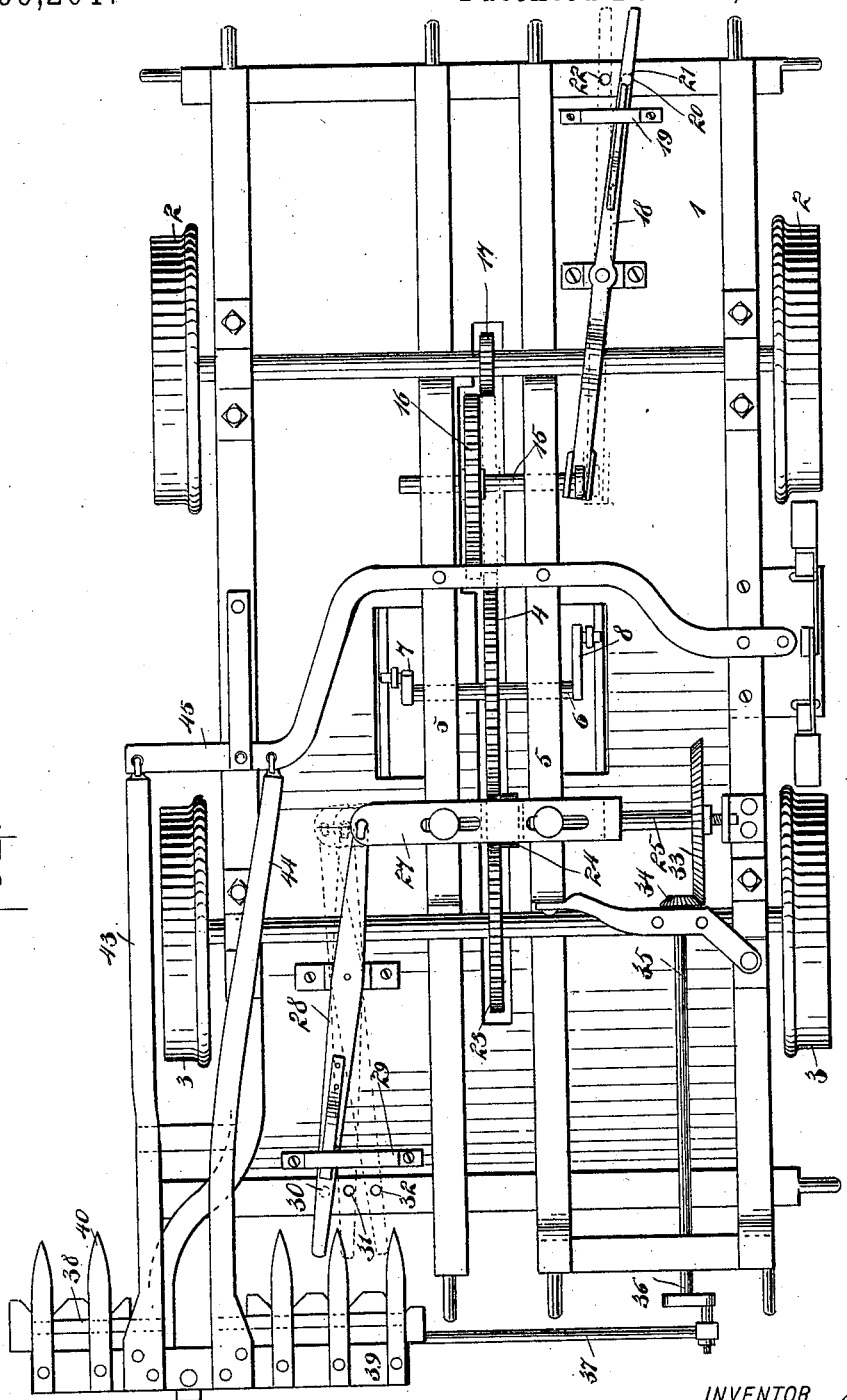
WITNESSES:
INVENTOR
J. L. Smith
BY
ATTORNEYS.

(No Model.) 3 Sheets—Sheet 3.
J. L. SMITH.
COMBINED HAND CAR AND MOWING MACHINE.
No. 599,201. Patented Feb. 15, 1898.
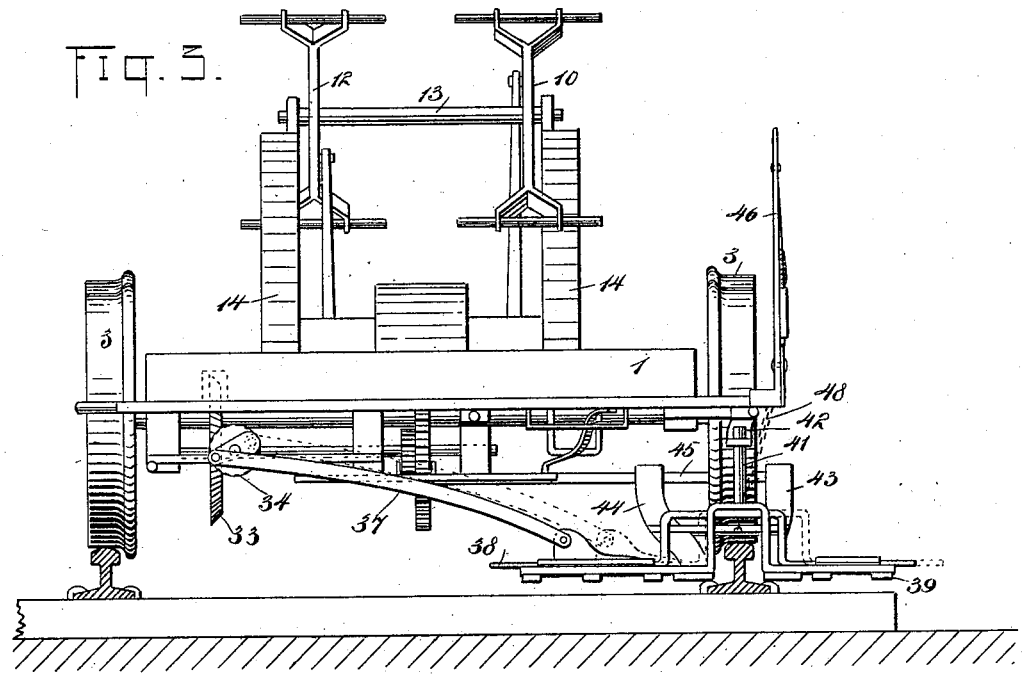
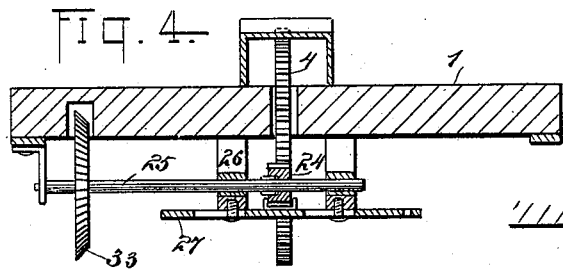
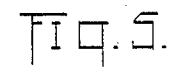
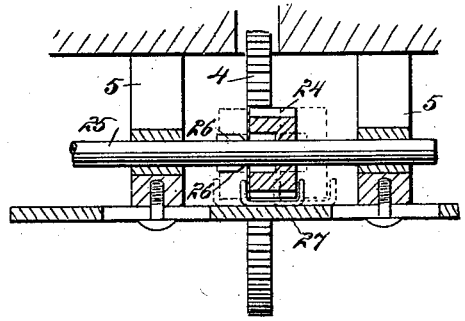
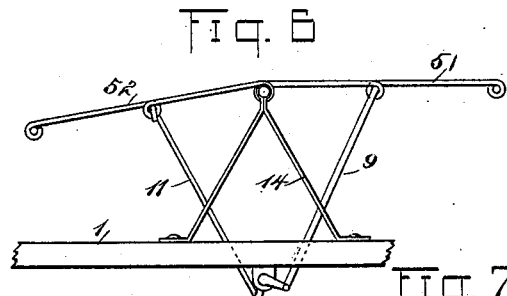
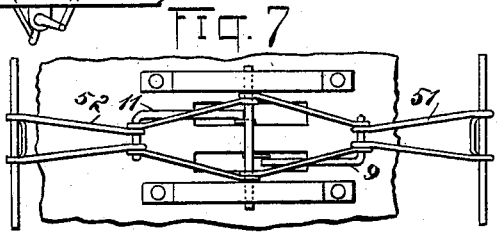
WITNESSES:
H. Hillyer.
C. R. Ferguson
INVENTOR
J. L. Smith.
BY
ATTORNEYS.
THE NORRIS PETERS CO., PHOTO-LITHO., WASHINGTON, D. C.

UNITED STATES PATENT OFFICE.

JOHN LEWIS SMITH, OF SUMNER, NEBRASKA, ASSIGNOR TO HIMSELF AND OLIVIA THOMAS, OF SAME PLACE.

COMBINED HAND-CAR AND MOWING-MACHINE.

SPECIFICATION forming part of Letters Patent No. 599,201, dated February 15, 1898.

Application filed April 17, 1897. Serial No. 632,547. (No model.)

*To all whom it may concern:*

Be it known that I, JOHN LEWIS SMITH, of Sumner, in the county of Dawson and State of Nebraska, have invented a new and Improved Combined Hand-Car and Mowing-Machine, of which the following is a full, clear, and exact description.

This invention relates to hand-cars having a grass or weed cutting attachment for cutting the grass and weeds along the sides of the track-rails; and the object is to provide a hand-car and a cutting or mowing attachment so constructed that the cutting or mowing attachment will yield vertically to ride over any obstructions that it might meet, and, further, to so construct the parts that the cutting or mowing attachment may be quickly detached from the car, thus putting the car in condition for ordinary use at any time of the year.

I will describe a combined hand-car and mowing-machine embodying my invention and then point out the novel features in the appended claims.

Reference is to be had to the accompanying drawings, forming a part of this specification, in which similar characters of reference indicate corresponding parts in all the views.

Figure 1 is a side elevation of a combined hand-car and mowing-machine embodying my invention. Fig. 2 is a bottom plan view thereof. Fig. 3 is a rear elevation. Fig. 4 is a sectional detail showing means for throwing the cutting mechanism into and out of gear with the driving-wheels of the car. Fig. 5 is a similar view, but showing the parts in another position. Fig. 6 is a side elevation showing a modified form of hand-lever employed on the car, and Fig. 7 is a plan view thereof.

The car comprises a platform 1, mounted on front wheels 2 and rear wheels 3. A gear-wheel 4 has its shaft-bearings in hangers 5, secured to the under side of the platform 1. The shaft 6 of the gear-wheel 4 has cranks 7 and 8 at its opposite ends, which extend at one-fourth angle to each other, thus avoiding dead-centers and lost motion. From the crank 7 a link 9 extends upward through an opening in the platform and has a pivotal connection with a hand-operated lever 10, and from the crank 8 a link 11 extends upward to a pivotal connection with a hand operating-lever 12. These operating-levers 10 and 12 are mounted to rock on a shaft 13, supported on standards 14, extended upward from the platform 1. The opposite ends of the levers 10 and 12 will of course be provided with suitable handle-bars. With these levers, as described, the car may be operated by four men.

Mounted on a shaft 15, supported in the hangers 5 and designed to be moved longitudinally therewith, is a gear-wheel 16, designed to be thrown into and out of engagement with the gear-wheel 4 and with a pinion 17 on the axle of the front wheels 2. Fulcrumed to the bottom of the platform 1 is a lever 18, which at its inner end has a yoke connection with the shaft 15 and its outer end extends beyond the front of the platform. The outer portion of this lever 18 extends loosely through a loop 19, fastened to the bottom of the platform, and it is provided with a pin 20, designed to be engaged in either one of the holes 21 or 22, formed in the bottom of the end sill of the platform.

Mounted on the axle of the rear wheels 3 is a gear-wheel 23, adapted to be thrown into engagement with the gear-wheel 4 by an intermediate pinion 24, mounted to slide on the cutter-bar-operating shaft 25. This intermediate gear 24 is designed to transmit motion between the gear-wheels 4 and 23 and also to transmit rotary motion to the cutter-operating shaft 25, and it may be thrown wholly out of gear with the wheels 4 and 23 for a purpose to be hereinafter described.

The intermediate gear 24, it will be seen, is made somewhat wider than the wheels 4 and 23. The shaft 25 is provided with feathers 26, designed to engage in slot-openings formed in the intermediate gear 24, so that when in such engagement the shaft 25 will be rotated by said gear to operate the cutter-bar. The intermediate gear 24 is moved to its three positions by means of a shifting bar 27, having slot-openings through which lugs or screws pass into the hangers 5. This shifting bar 27 has upwardly-extending fingers engaging on opposite sides of the intermediate gear 24. One end of the shifting bar 27 is engaged by a shifting lever 28, fulcrumed to the under side of the platform 1 and extended outward beyond the rear end thereof. This lever 28 extends through a loop 29, secured to the under side of the platform 1, and it is provided with a pin adapted to engage in either one of the three perforations 30, 31, or 32.

On the shaft 25 is mounted a bevel-gear 33, meshing with a bevel-pinion 34 on a shaft 35, the rear end of which is provided with a crank 36, from which a pitman 37 extends to a pivotal connection with the cutter-bar 38. This cutter-bar 38 is provided with cutter-blades, and it is reciprocated through a frame 39, having forwardly-extended fingers 40, which are curved upward on their under side. The frame 39 between its ends has a loop portion which extends over the rails of the track. From the loop portion a guide-rod 41 extends upward and passes loosely through an opening in a bracket 42, secured to the platform 1 or to a bar extended horizontally beneath the same. From the frame 39 arms 43 and 44 extend forward and have hook-shaped ends to engage through perforations in a bar 45, secured to the under side of the platform. By this construction it will be seen that the cutter-bar and its frame may swing upward should the same come in contact with an obstruction on the track. The cutting apparatus may be raised and lowered as desired. As a means therefor I employ a lever 46, pivoted to a bracket 47 on the platform 1. This lever 46 at its pivoted end has a hook portion from which a chain 48 extends to a connection with the arm 43. The lever 46 is provided with a spring-pressed dog 49, adapted to engage with a shoulder 50 on the bracket 47 to hold the cutter in its elevated position.

In Figs. 6 and 7 I have shown oppositely-disposed operating-levers 51 and 52, having the link connections 9 and 11 with the cranks of the gear 4, as before described. These operating-levers are designed for use with a car driven by two men.

In operation when cutting the grass or weeds along a track the lever 28 will be shifted to engage its pin in the hole 32. This will throw the intermediate gear 24 into engagement with the feathers 26 and also into engagement with the gear-wheels 4 and 23. Therefore as the car is propelled forward motion will be imparted to the shaft 25, and consequently to the cutter mechanism. Should it be desired to operate the car without operating the cutter, the lever 28 will be shifted to engage its pin in the hole 31, so that the intermediate gear 24 will be moved out of engagement with the feathers 26, but will remain in engagement with the gear-wheels 4 and 23, and while so engaged a comparatively slow motion will be imparted to the car. If a fast motion is desired for the car, the intermediate gear 24 will be thrown out of engagement with the gear-wheels 4 and 23 by shifting the lever 28 to engage its pin in the hole 30, and then the lever 18 must be shifted to engage its pin in the hole 22, and thus shift the gear-wheel 16 into engagement with the wheels 4 and 17.

When the car is desired for ordinary use, the cutter mechanism may be removed therefrom by releasing the pitman 37 from the crank 36, and then by turning the car upward or on one side the hooks of the arms 43 and 44 may be disengaged from the bar 45.

Having thus described my invention, I claim as new and desire to secure by Letters Patent—

1. A combined hand-car and mowing-machine, comprising a platform, front and rear wheels upon which said platform is mounted, hand-levers mounted to rock on the platform, a driving gear-wheel having cranks on the ends of its shaft, links between said cranks and the hand-levers, a pinion on the axle of the front wheels, a gear-wheel adapted for engagement with said pinion and with the driving-gear, a lever for shifting said gear-wheel laterally, a gear-wheel on the axle of the rear wheels, an intermediate pinion, means for moving said intermediate pinion into and out of engagement with the gear-wheel on the rear axle and driving-gear, and a cutter-bar adapted to be operated by said intermediate pinion, substantially as specified.

2. In a hand-car, a driving gear-wheel, a hand-lever for operating the same, a gear-wheel on an axle of the car, a cutter-bar-operating shaft, a cutter-bar operated by the shaft, a pinion mounted on the shaft and forming a connection between the two first-named gear-wheels, and means for moving the pinion into and out of clutch connection with the shaft but retaining its connection with the gear-wheels, thus forming a portion of the driving mechanism of the car, the said means also serving to move the pinion wholly out of engagement with the gear-wheels, substantially as specified.

3. A hand-car, comprising a platform, front and rear wheels upon which said platform is mounted, a driving mechanism for the car comprising a driving-gear operated by hand-levers, a gear-wheel on the rear axle, an intermediate gear, a cutter-bar, a cutter-bar shaft upon which the intermediate gear is movable longitudinally, a lever fulcrumed to the under side of the platform, a shifting bar with which said lever connects, fingers extended from the bar and engaging on opposite sides of the intermediate gear, a feather on the cutter-bar-operating shaft adapted to engage in slots formed in the intermediate gear, and a vertically-movable frame having forwardly-projected teeth in which the cutter-bar reciprocates, substantially as specified.

4. A hand-car, comprising a platform, front and rear wheels upon which the platform is supported, hand operating-levers mounted on a shaft above the platform, a driving-gear having cranks at the ends of its shaft, link connections between the levers and cranks, a gear-wheel on the axle of the rear wheels of the car, a cutter-bar-operating shaft, an intermediate gear on said shaft and adapted to move longitudinally of the same, means for moving said intermediate gear into operative connection with said shaft, and to move said gear out of operative connection with the shaft but in engagement with the driving-gear and the gear on the rear axle, and also to move said intermediate gear out of engagement with the driving-gear and the gear-wheel on the rear shaft, a crank-shaft, gear connections between the crank-shaft and cutter-bar-operating shaft, a crank on the rear end of the crank-shaft, a cutter-bar carrying cutters, a pitman extended from the cutter-bar to the crank on the crank-shaft, a frame in which the cutter-bar is reciprocated, and arms extended forward from said frame to a swinging connection with the car-platform, substantially as specified.

JOHN LEWIS SMITH.

Witnesses:
GEORGE B. LODGE,
FRANK J. SEVERIN.